(12) United States Patent
Hoxie et al.

(10) Patent No.: US 9,416,829 B2
(45) Date of Patent: Aug. 16, 2016

(54) PIVOT PAD BRAKE CALIPER

(75) Inventors: Steven Glenn Hoxie, Howell, MI (US); Martin John Reder, Essexville, MI (US)

(73) Assignee: BeijingWest Industries Co. Ltd., Beijing (CN)

( * ) Notice: Subject to any disclaimer, the term of this patent is extended or adjusted under 35 U.S.C. 154(b) by 113 days.

(21) Appl. No.: 14/124,314

(22) PCT Filed: Aug. 2, 2011

(86) PCT No.: PCT/CN2011/077906
§ 371 (c)(1),
(2), (4) Date: Dec. 6, 2013

(87) PCT Pub. No.: WO2012/167495
PCT Pub. Date: Dec. 13, 2012

(65) Prior Publication Data
US 2014/0124303 A1     May 8, 2014

Related U.S. Application Data

(60) Provisional application No. 61/494,978, filed on Jun. 9, 2011.

(51) Int. Cl.
F16D 55/226     (2006.01)
B60T 1/06       (2006.01)
F16D 65/00      (2006.01)
F16D 66/02      (2006.01)
(Continued)

(52) U.S. Cl.
CPC .............. *F16D 55/226* (2013.01); *B60T 1/065* (2013.01); *F16D 55/2265* (2013.01); *F16D 65/0068* (2013.01); *F16D 65/12* (2013.01); *F16D 66/02* (2013.01); *F16D 55/2262* (2013.01); *F16D 2121/04* (2013.01)

(58) Field of Classification Search
CPC .............. F16D 55/226; F16D 55/2262; F16D 55/2265; F16D 55/227; F16D 66/02
USPC ..................................... 188/71.1, 72.4, 73.31
See application file for complete search history.

(56) References Cited

U.S. PATENT DOCUMENTS 4,289,216 A * 9/1981 Shirai et al. ................... 188/72.2
4,410,070 A   10/1983 Hagiwara et al.
(Continued)

FOREIGN PATENT DOCUMENTS

CN   1206079 A    1/1999
EP   0191597 A1   8/1986
(Continued)

*Primary Examiner* — Thomas Irvin
(74) *Attorney, Agent, or Firm* — Dickinson Wright PLLC

(57) ABSTRACT

A caliper housing including a piston bore and a bridge extending between the piston bore and a pair of caliper fingers interconnecting the caliper fingers and the piston bore. The caliper fingers of the caliper housing extend downwardly from the bridge to define a flat surface. A rotor having a disc shape defines a first side and a second side and disposed adjacent to the caliper fingers. An outer brake pad defining a first centroid is disposed adjacent to the first side of the rotor abutting the caliper fingers allowing the caliper fingers to urge the outer brake pad into engagement with the first side of the rotor. Each of the caliper fingers defines a pivot edge extending between the outer brake pad and the flat surface of the caliper fingers allowing the outer brake pad to pivot about the pivot edge.

13 Claims, 6 Drawing Sheets

(51) Int. Cl.
  *F16D 55/2265* (2006.01)
  *F16D 65/12* (2006.01)
  *F16D 121/04* (2012.01)

(56) References Cited

U.S. PATENT DOCUMENTS

| | | | |
|---|---|---|---|
| 4,940,119 A | 7/1990 | Kondo et al. | |
| 5,022,500 A | 6/1991 | Wang | |
| 5,036,932 A * | 8/1991 | Schonenberger | 188/71.1 |
| 5,060,766 A * | 10/1991 | Kondo | 188/73.39 |
| 5,377,792 A | 1/1995 | Idesawa | |
| 5,499,696 A * | 3/1996 | Kobayashi et al. | 188/1.11 W |
| 6,189,659 B1 * | 2/2001 | Doi et al. | 188/73.35 |
| 7,438,160 B2 * | 10/2008 | Maehara | 188/73.31 |
| 7,849,982 B1 * | 12/2010 | Tamura et al. | 188/250 G |
| 2005/0252727 A1 | 11/2005 | England et al. | |
| 2006/0289253 A1 * | 12/2006 | DeMorais et al. | 188/218 R |
| 2010/0051393 A1 * | 3/2010 | Arioka | 188/72.3 |
| 2011/0127122 A1 * | 6/2011 | Suh | 188/72.4 |
| 2011/0180354 A1 * | 7/2011 | Wagner et al. | 188/71.1 |
| 2011/0297491 A1 * | 12/2011 | Lowe et al. | 188/73.31 |
| 2012/0067678 A1 * | 3/2012 | Andrews et al. | 188/206 A |
| 2013/0025981 A1 * | 1/2013 | Maehara et al. | 188/72.3 |
| 2013/0025982 A1 * | 1/2013 | Suzuki et al. | 188/72.4 |
| 2013/0299288 A1 * | 11/2013 | Ryu et al. | 188/72.4 |
| 2014/0116817 A1 * | 5/2014 | Morais et al. | 188/73.45 |
| 2014/0262635 A1 * | 9/2014 | Vinck et al. | 188/72.6 |
| 2015/0136537 A1 * | 5/2015 | Kaneko et al. | 188/72.4 |

FOREIGN PATENT DOCUMENTS

| | | |
|---|---|---|
| GB | 2143916 A | 2/1985 |
| GB | 2458789 A | 10/2009 |
| JP | 61082026 | 4/1986 |
| JP | S62-149540 U | 9/1987 |
| JP | H02-031923 U | 2/1990 |
| JP | H02319213 U | 2/1990 |
| JP | H04003135 U | 4/1992 |
| JP | 64053648 | 4/1994 |
| JP | H07305724 A | 11/1995 |
| JP | H09329162 A | 12/1997 |
| JP | 2005326013 A | 11/2005 |
| JP | 2007198502 | 8/2007 |
| JP | 2009243564 A | 10/2009 |

* cited by examiner

PIVOT PAD BRAKE CALIPER

BACKGROUND OF THE INVENTION

1. Field of the Invention

The present invention relates to a brake caliper assembly for a vehicle.

2. Description of the Prior Art

Such assembly is disclosed in the U.S. Pat. No. 5,036,932 to Schonenberger wherein a caliper housing includes a piston bore of generally cylindrical shape disposed horizontally along a first center axis and a bridge extending between the piston bore and a caliper fingers interconnecting the caliper fingers and the piston bore. The caliper finger extends downwardly from the bridge to define a flat surface. A rotor of generally disc shape defines a first side and a second side for rotation about a second center axis and disposed adjacent to the caliper finger. An outer brake defines a first centroid disposed between the second side of the rotor and the caliper finger.

It has long been recognized that the thickness of the brake disc rotor can vary circumferentially and radially and the rotor thickness variation can create brake torque variation which drivers may feel as pulsation or juddering sensations when applying the brakes of the vehicle. The assembly disclosed in U.S. Pat. No. 5,036,932 have attempted to control the brake torque variation by reducing the stiffness of the caliper assembly. However, reducing the stiffness of the caliper assembly can often result in a decrease in brake performance such as increased brake drag, brake pad taper wear, and brake distance. The decrease in brake performance may translate into vehicle issues such as degraded fuel economy, increased stopping distance, and poor pedal feel.

Therefore it is desirable to improve the control of the brake torque variation for a given rotor thickness variation without sacrificing the overall stiffness of the caliper assembly. At the same time, it is desirable to improve the taper wear of the brake pads.

SUMMARY OF THE INVENTION

The invention provides for such brake caliper assembly for a vehicle wherein each of the caliper finger defines a pivot edge extending between the outer brake pad and the flat surface of the caliper fingers allowing the outer brake pad to pivot about the pivot edge.

The present invention modifies the calipers response to the radial component of disc thickness variation, reduces brake torque variation, and provides for an improved taper wear of the brake pads and a reduction of the juddering sensation felt by the drivers when applying the brakes of the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
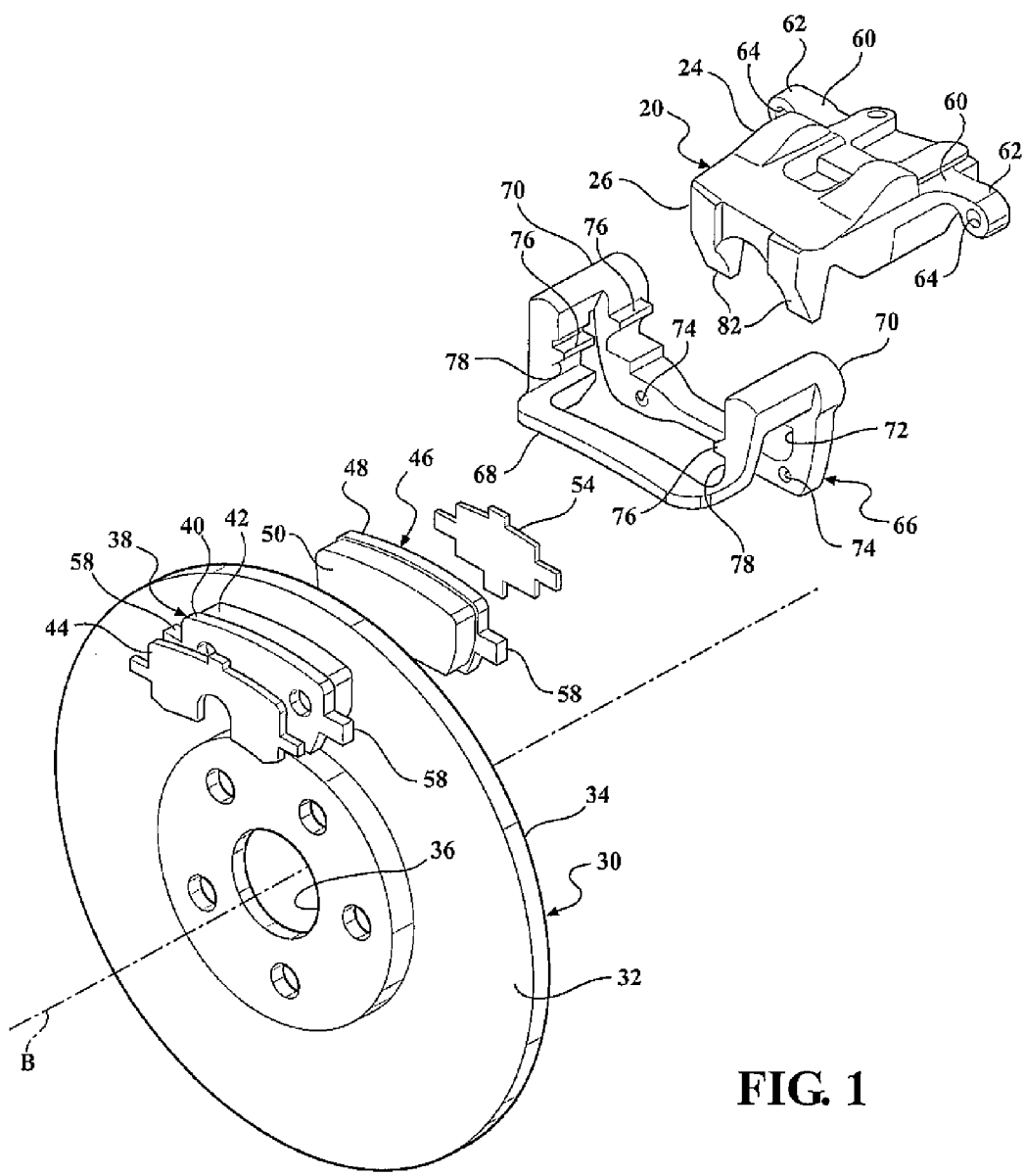
FIG. 1 is a perspective view of a preferred embodiment of the brake caliper assembly of a vehicle constructed in accordance with the subject invention.
Figure 2:
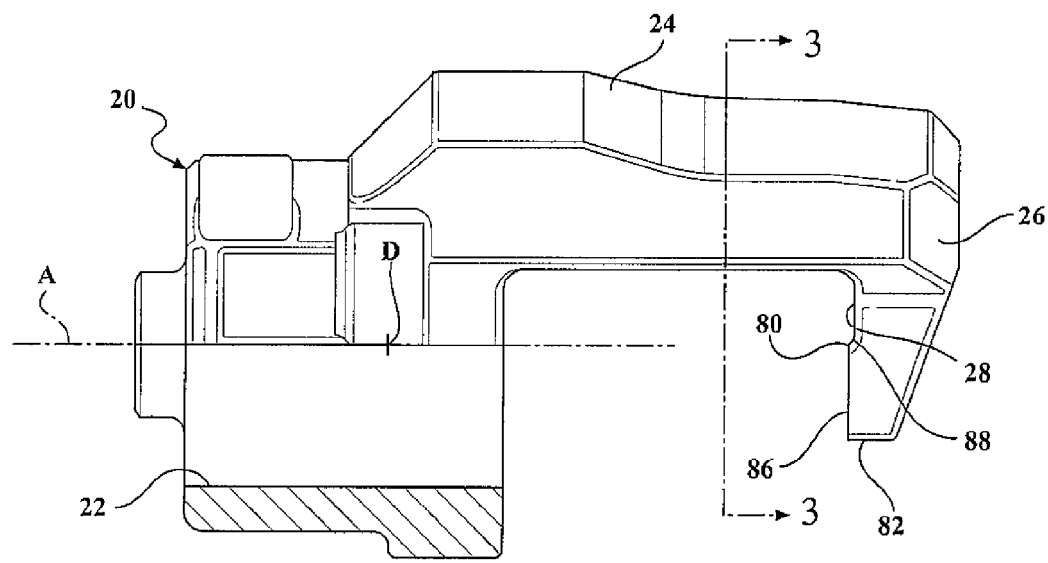
FIG. 2 is a side view of the brake caliper assembly with a partial cross-sectional view of the piston bore.
Figure 3:
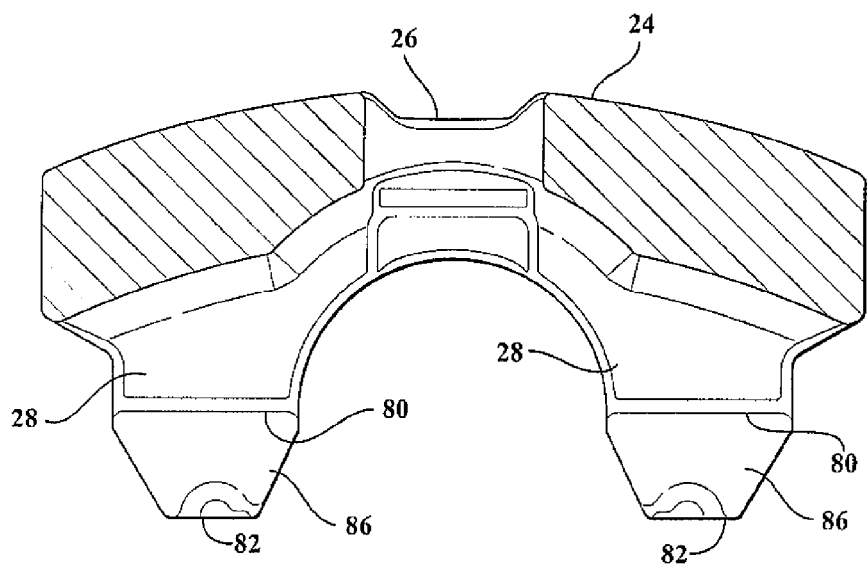
FIG. 3 is a cross-sectional view of the caliper housing taken along the line 3-3 of FIG. 2.
Figure 4:
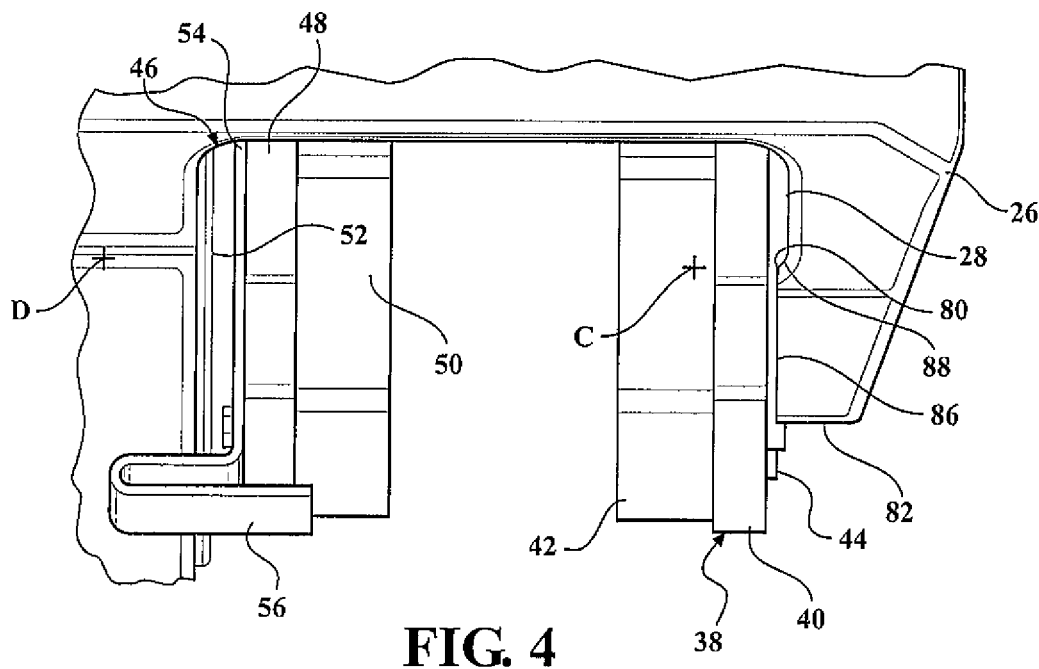
FIG. 4 is an enlarge fragmentary side view of the assembly.
Figure 5:
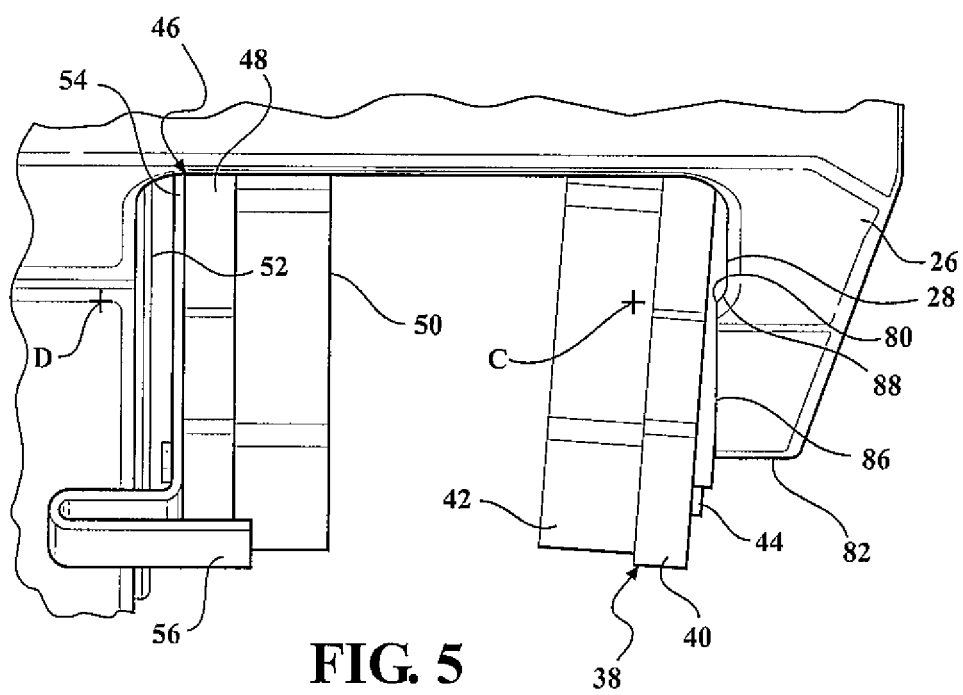
FIG. 5 is an enlarged fragmentary side view of the assembly showing the outer brake pad pivoting about the pivot edge.

Referring to the Figures, wherein like numerals indicate corresponding parts throughout the several views, a brake caliper assembly for a vehicle is generally shown in FIG. 1.

The assembly includes a caliper housing 20, as generally indicated, including a piston bore 22 having a cylindrical shape disposed horizontally along a first center axis A and a bridge 24 extending between the piston bore 22 and a pair of caliper fingers 26 interconnecting the caliper fingers 26 and the piston bore 22. The caliper fingers 26 of the caliper housing 20 extend downwardly from the bridge 24 in a spaced and parallel relationship to define a flat surface 28.

A rotor 30, as generally indicated and having a disc shape defines a first side 32 and a second side 34 for rotation about a second center axis B and disposed adjacent to the caliper fingers 26. The rotor 30 defines a center aperture 36 disposed along the second center axis B extending between the first side 32 of the rotor 30 and the second side 34 of the rotor 30.

An outer brake pad 38, as generally indicated, defining a first centroid C is disposed adjacent to the first side 32 of the rotor 30 abutting the caliper fingers 26 allowing the caliper fingers 26 to urge the outer brake pad 38 into engagement with the first side 32 of the rotor 30. The outer brake pad 38 comprises of an outer brake pad mounting plate 40 and a first frictional material 42 disposed on the outer brake pad mounting plate 40. A first shim 44 is disposed on the outer brake pad 38 between the caliper fingers 26 and the outer brake pad mounting plate 40.

An inner brake pad 46, as generally indicated, is disposed adjacent to the piston bore 22 between the second side 34 of the rotor 30 and the piston bore 22. The inner brake pad 46 comprises of an inner brake pad mounting plate 48 and a second frictional material 50 disposed on the inner brake pad mounting plate 48. A piston 52 defining a second centroid D is disposed in the piston bore 22 along the first center axis A abutting the inner brake pad 46 for urging the inner brake pad 46 against the second side 34 of the rotor 30. A second shim 54 is disposed on the inner brake pad 46 between the piston 52 and the inner brake pad mounting plate 48. A brake pad wear indicator 56 attaches to the second shim 54 of the inner brake pad 46 and extending perpendicularly from the second shim 54 toward the rotor 30 for monitoring the attrition of the inner brake pad 46. Alternatively, the brake pad indicator can be attached to the first shim of the outer brake pad 38 for monitoring the attrition of the outer brake pad 38.

The mounting plates 40, 48 of the brake pads 38, 46 include a pair of guides 58 extending horizontally and diametrically from the mounting plate. The piston bore 22 includes a pair of mounting arms 60 extending horizontally and diametrically outwardly from the piston bore 22 to a distal end 62. The distal end 62 of each of the mounting arms 60 defines a mounting aperture 64 for attaching the caliper housing 20 to a support bracket 66.

The support bracket 66, as generally indicated, and having a cradle shape include a base 68 and a pair of legs 70 extending perpendicularly from the base 68 in a spaced and parallel relationship defining a channel 72 extending between the legs 70 and the base 68 of the support bracket 66. The base 68 of the support bracket 66 defines a plurality of apertures 74 for securing the support bracket 66 to the vehicle. Each of the legs 70 of the support bracket 66 includes a plurality of flanges 76 extending from the leg 70 in a perpendicular relationship to define a plurality of recesses 78. The guides 58 of the brake pads 38, 46 are disposed in the recesses 78 of the legs 70 attaching the brake pads 38, 46 between the legs 70 of the support bracket 66. The support bracket 66 is disposed over the rotor 30 allowing a portion of the rotor 30 to pass through the channel 72 of the support bracket 66 and the outer brake pad 38 disposed adjacent to the first side 32 of the rotor 30 and the inner brake pad 46 disposed adjacent to the second side 34 of the rotor 30 and movable into brake engagement therewith.

Figure 6:
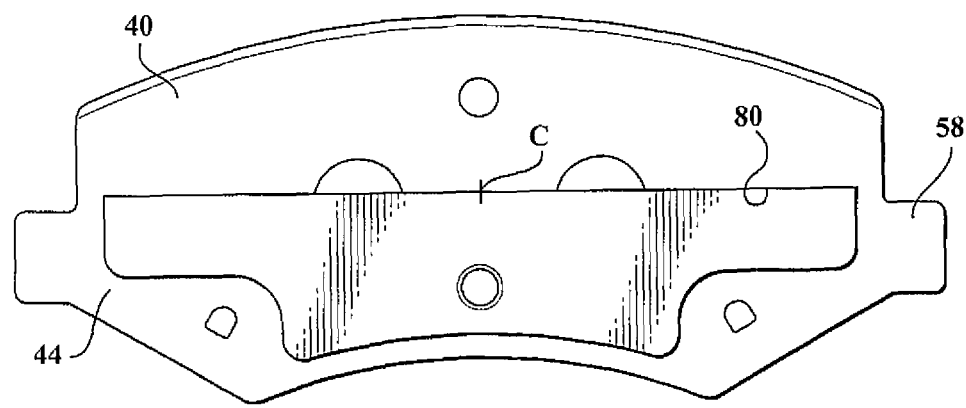
FIG. 6 is a back view of the outer brake pad for an alternative embodiment of the subject invention.
Figure 7:
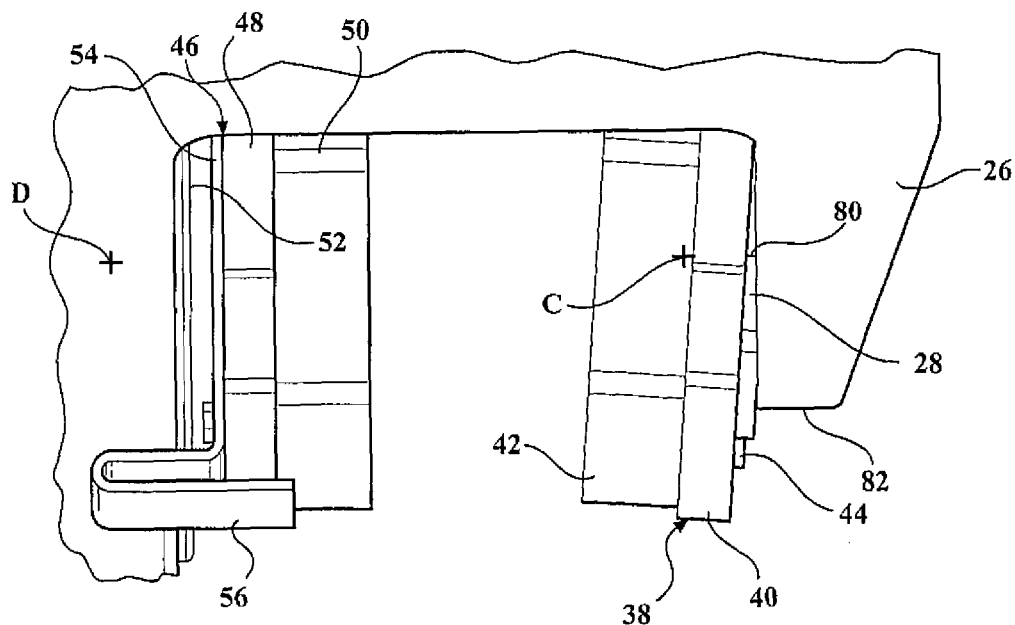
FIG. 7 is an enlarged fragmentary side view for an alternative embodiment of the subject invention showing the outer brake pad pivoting about the pivot edge.

Each of the caliper fingers 26 defines a pivot edge 80 extending between the outer brake pad 38 and the flat surface 28 of the caliper fingers 26 for allowing the outer brake pad 38 to pivot about the pivot edge 80. Each of the caliper fingers 26 tapers downwardly from the pivot edge 80 to a caliper finger distal end 82. The pivot edge 80 and the second centroid D of the piston 52 disposed within a middle twenty-five percent 84 (25%) (not shown) of the first centroid C of the outer brake pad 38. The flat surface 28 of the caliper fingers 26 includes an interface surface 86 protruding from the flat surface 28 to define the pivot edge 80 on a shoulder 88 engaging the outer brake pad 38. Alternatively, the first shim 44 can be disposed adjacent to, preferably slightly above, the first centroid C of the outer brake pad 38 to define the pivot edge 80 (shown in FIG. 6 and FIG. 7). In other words, the pivot edge 80 is located in a position to facilitate pivotal movement of the pad 38 relative to the flat surface 28 as distinguished from the prior art as in the aforementioned U.S. Pat. No. 5,036,932.

Figure 8:
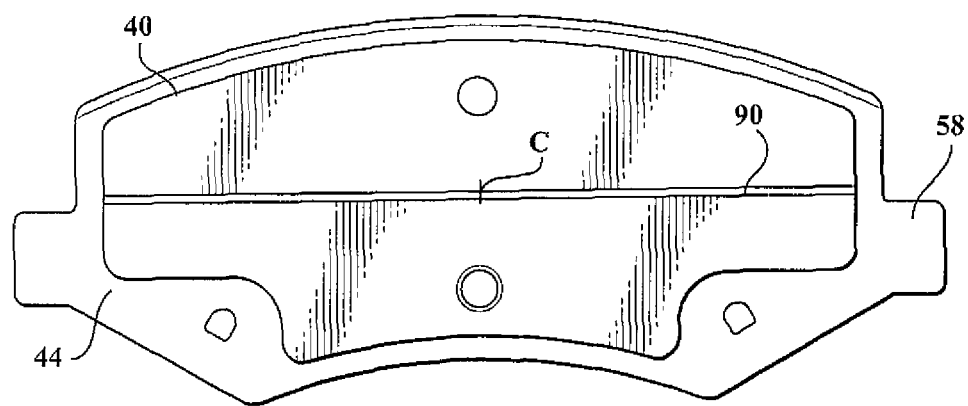
FIG. 8 is a back view of the outer brake for an alternative embodiment of the subject invention.
Figure 9:
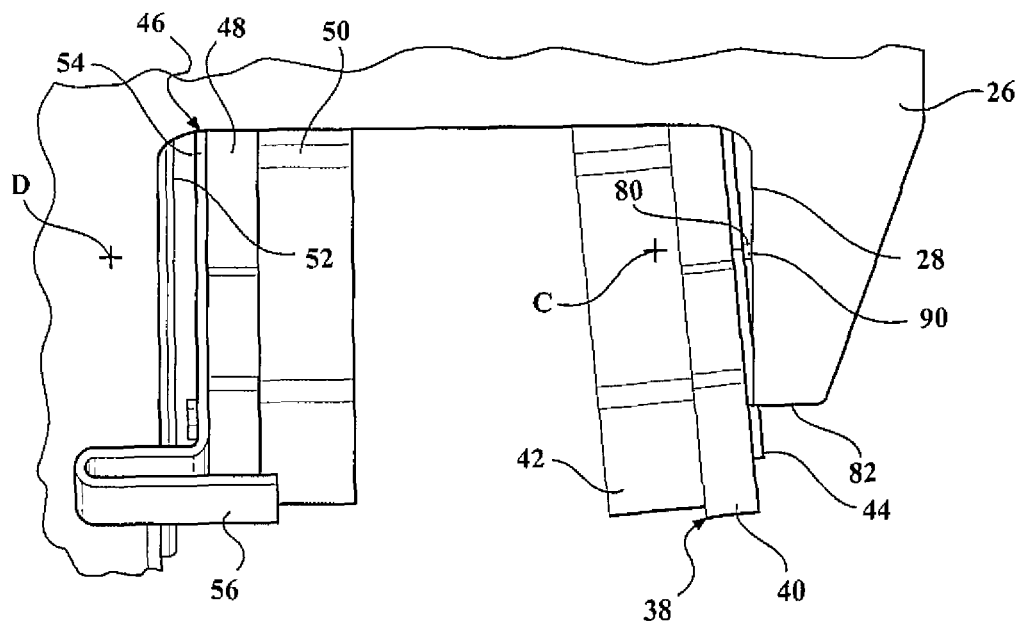
FIG. 9 is an enlarged fragmentary side view for an alternative embodiment of the subject invention showing the outer brake pad pivoting about the pivot edge.
Figure 10:
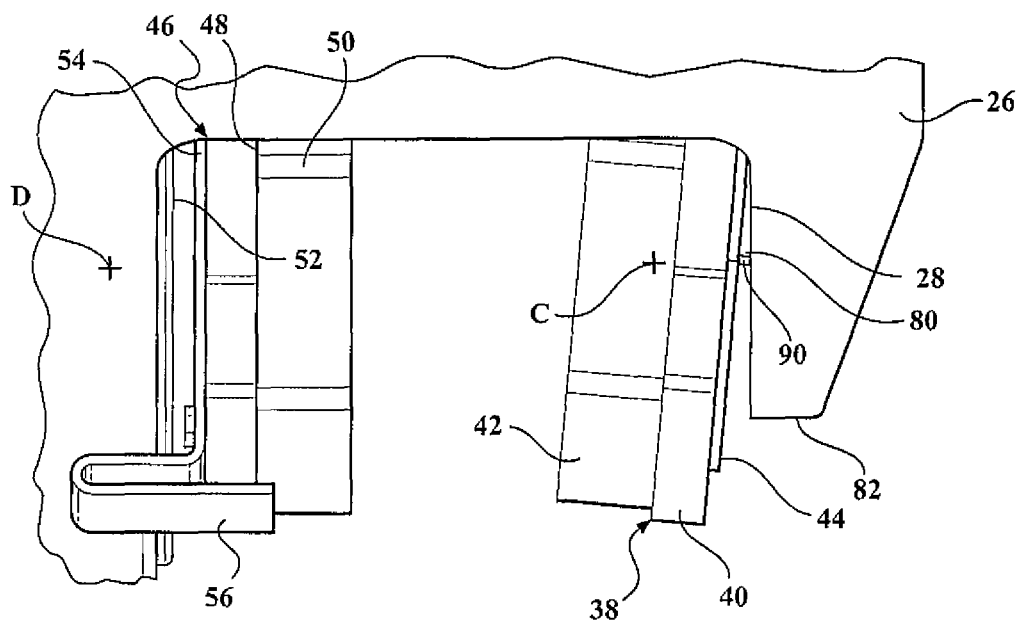
FIG. 10 is an enlarged fragmentary side view for an alternative embodiment of the subject invention showing the outer brake pad pivoting about the pivot edge.

Another alternative embodiment of the present invention is shown in FIG. 8, FIG. 9, and FIG. 10 wherein the pivot edge 80 is defined by a rib 90 extending horizontally between the outer brake pad 38 and the flat surface 28 of the caliper fingers 26. The rib 90 extends outwardly from the outer brake pad 38 in a perpendicular relationship to engage the flat surface 28 of the caliper fingers 26.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

ELEMENT LIST

| Element Symbol | Element Name |
| --- | --- |
| A | First Center Axis |
| B | Second Center Axis |
| C | First Centroid |
| D | Second Centroid |
| 20 | Caliper Housing |
| 22 | Piston Bore |
| 24 | Bridge |
| 26 | Caliper Finger |
| 28 | Flat Surface |
| 30 | Rotor |
| 32 | First Side |
| 34 | Second Side |
| 36 | Center Aperture |
| 38 | Outer Brake Pad |
| 40 | Outer Brake Pad Mounting Plate |
| 42 | First Frictional Material |
| 44 | First Shim |
| 46 | Inner Brake Pad |
| 48 | Inner Brake Pad Mounting Plate |
| 50 | Second Frictional Material |
| 52 | Piston |
| 54 | Second Shim |
| 56 | Brake Pad Wear Indicator |
| 58 | Guide |
| 60 | Mounting Arm |
| 62 | Distal End |
| 64 | Mounting Aperture |
| 66 | Support Bracket |
| 68 | Base |
| 70 | Leg |
| 72 | Channel |
| 74 | Aperture |
| 76 | Flange |
| 78 | Recess |
| 80 | Pivot Edge |
| 82 | Caliper Finger Distal End |
| 84 | Middle Twenty-Five Percent |
| 86 | Interface Surface |
| 88 | Shoulder |
| 90 | Rib |

What is claimed is:

1. A brake caliper assembly for a vehicle comprising:

a caliper housing including a piston bore of generally cylindrical shape disposed horizontally along a first center axis and a bridge extending between said piston bore and caliper fingers and interconnecting said caliper fingers and said piston bore, said caliper finger extending downwardly from said bridge to define a flat surface, a rotor of generally disc shape defining a first side and a second side for rotation about a second center axis and disposed adjacent to said caliper finger, an outer brake pad defining a first centroid disposed between said first side of said rotor and said caliper finger, each of said caliper fingers defining a pivot edge extending between said outer brake pad and said flat surface of said caliper fingers, said outer brake pad pivotable about said pivot edge, wherein said pivot edge is located in a position to facilitate pivotal movement of said outer brake pad relative to said flat surface of said caliper fingers, and wherein said pivot edge is generally aligned with said first centroid of said outer brake pad in a radial direction which is perpendicular to said first center axis, and wherein said pivot edge is spaced from said first centroid of said outer brake pad in said radial direction by a distance of no more than twenty-five percent (25%) of the height of said outer brake pad.

2. An assembly as set forth in claim 1 wherein said caliper fingers taper downwardly from said pivot edge to a caliper finger distal end.

3. An assembly as set forth in claim 1 including a piston defining a second centroid disposed in said piston bore wherein said second centroid is within said middle twenty-five percent (25%) of said first centroid of said outer brake pad.

4. An assembly as set forth in claim 3 wherein said flat surface of said caliper finger includes an interface surface protruding from said flat surface to define said pivot edge on a shoulder engaging said outer brake pad.

5. An assembly as set forth in claim 1 wherein said rotor defines a center aperture disposed along said second center axis extending between said first side of said rotor and said second side of said rotor.

6. An assembly as set forth in claim 1 wherein said outer brake pad comprises of an outer brake pad mounting plate and a first frictional material disposed on said outer brake pad mounting plate.

7. An assembly as set forth in claim 1 including an inner brake pad adjacent to said piston bore between said second side of said rotor and said piston bore.

8. An assembly as set forth in claim 7 wherein said inner brake pad comprises of an inner brake pad mounting plate and a second frictional material disposed on said inner brake pad mounting plate.

9. An assembly as set forth in claim 8 including a second shim disposed on said inner brake pad between said piston bore and said inner brake pad mounting plate.

10. An assembly as set forth in claim 9 including a brake pad wear indicated attaching to said second shim of said inner brake pad and extending perpendicularly from said second shim toward said rotor for monitoring the attrition of said inner brake pad.

11. An assembly as set forth in claim 1 wherein said piston bore include a pair of mounting arms extending horizontally and diametrically outwardly from said piston bore to a distal end.

12. A brake caliper assembly for a vehicle comprising:
a caliper housing including a piston bore of generally cylindrical shape disposed horizontally along a first center axis and a bridge extending between said piston bore and a pair of caliper fingers interconnecting said caliper fingers and said piston bore,
said caliper fingers of said caliper housing extending downwardly from said bridge in a spaced and parallel relationship to define a flat surface,
a rotor of generally disc shape defining a first side and a second side for rotation about a second center axis and disposed adjacent to said caliper fingers,
said rotor defining a center aperture disposed along said second center axis extending between said first side of said rotor and said second side of said rotor,
an outer brake pad defining a first centroid disposed adjacent to said first side of said rotor abutting said caliper fingers allowing said caliper fingers to urge said outer brake pad into engagement with said first side of said rotor,
said outer brake pad comprising an outer brake pad mounting plate and a first frictional material disposed on said outer brake pad mounting plate,
a first shim disposed on said outer brake pad between said caliper fingers and said outer brake pad mounting plate,
an inner brake pad disposed adjacent to said piston bore between said second side of said rotor and said piston bore,
said inner brake pad comprising an inner brake pad mounting plate and a second frictional material disposed on said inner brake pad mounting plate,
a piston defining a second centroid disposed in said piston bore along said first center axis abutting said inner brake pad for urging said inner brake pad against said second side of said rotor,
a second shim disposed on said inner brake pad between said piston and said inner brake pad mounting plate,
a brake pad wear indicator attaching to said second shim of said inner brake pad and extending perpendicularly from said second shim toward said rotor for monitoring the attrition of said inner brake pad,
said mounting plates of said brake pads including a pair of guides extending horizontally and diametrically from said mounting plate,
said piston bore including a pair of mounting arms extending horizontally and diametrically outwardly from said piston bore to a distal end,
said distal end of each of said mounting arms defining a mounting aperture for attaching said caliper housing to a support bracket,
said support bracket of generally cradle shape including a base and a pair of legs extending perpendicularly from said base in a space and parallel relationship defining a channel extending between said legs and said base of said support bracket,
said base of said support bracket defining a plurality of apertures for securing said support bracket to the vehicle,
each of said legs of said support bracket including a plurality of flanges extending from said leg in a perpendicular relationship to define a plurality of recesses,
said guides of said brake pads disposed in said recesses of said legs attaching said brake pads between said legs of said support bracket,
said support bracket disposed over said rotor allowing a portion of said rotor to pass through said channel of said support bracket and said outer brake pad disposed adjacent to said first side of said rotor and said inner brake pad disposed adjacent to said second side of said rotor and movable into brake engagement therewith,
each of said caliper fingers defining a pivot edge extending between said outer brake pad and said flat surface of said caliper fingers,
said outer brake pad pivotable about said pivot edge,
each of said caliper fingers tapering downwardly from said pivot edge to a caliper finger distal end,
wherein said pivot edge is located in a position to facilitate pivotal movement of said outer brake pad relative to said flat surface of said caliper fingers,
wherein said pivot edge is generally aligned with said first centroid of said outer brake pad in a radial direction which is perpendicular to said first center axis, and
wherein said pivot edge and said second centroid of said piston are spaced from said first centroid of said outer brake pad in said radial direction by a distance of no more than twenty-five percent (25%) of the height of said outer brake pad.

13. An assembly as set forth in claim 12 wherein said flat surface of said caliper fingers includes an interface surface protruding from said flat surface to define said pivot edge on a shoulder engaging said outer brake pad.

* * * * *